United States Patent [19]

Darnell

[11] Patent Number: 5,368,308
[45] Date of Patent: Nov. 29, 1994

[54] SOUND RECORDING AND PLAY BACK SYSTEM

[76] Inventor: Donald L. Darnell, 1515 Ellen Ct., Auburn, Calif. 95602

[21] Appl. No.: 80,182

[22] Filed: Jun. 23, 1993

[51] Int. Cl.$^5$ .............................................. A63F 9/22
[52] U.S. Cl. ................................ 273/429; 273/460; 434/167; 434/169; 434/319; 434/321
[58] Field of Search ............... 273/460, 429, 430, 432; 434/167, 169, 308, 319–322; 84/600, 602, 603

[56] References Cited

U.S. PATENT DOCUMENTS

| | | |
|---|---|---|
| 3,276,144 | 10/1966 | Feldman . |
| 3,908,288 | 9/1975 | Brown, Jr. . |
| 4,326,710 | 4/1982 | Breslow et al. . |
| 4,336,935 | 6/1982 | Goldfarb ............................ 273/460 |
| 4,618,985 | 10/1986 | Pfeiffer . |
| 4,648,086 | 3/1987 | Koike . |
| 4,690,025 | 9/1987 | Hines et al. ........................ 84/1.18 |
| 4,731,847 | 3/1988 | Lybrook et al. ..................... 381/51 |
| 4,770,416 | 9/1988 | Shimizu et al. .................. 273/433 X |
| 4,884,972 | 12/1989 | Gasper ............................. 434/185 |
| 4,936,185 | 6/1990 | Yamagachi et al. . |
| 5,010,495 | 4/1991 | Willetts . |
| 5,038,658 | 8/1991 | Tsuruta et al. . |
| 5,059,126 | 10/1991 | Kimball ............................ 434/308 |
| 5,106,097 | 4/1992 | Levine ............................. 273/237 |
| 5,133,560 | 7/1992 | Small .............................. 273/439 |
| 5,145,447 | 9/1992 | Goldfarb . |

Primary Examiner—Jessica J. Harrison
Assistant Examiner—Kerry Owens
Attorney, Agent, or Firm—Thomas R. Lampe

[57] ABSTRACT

An electronic apparatus breaks a stream of recorded sound into discrete segments. The apparatus randomizes the order of the sound segments and will allow the sound segments to be re-ordered to their original order or to some desired order. The apparatus allows re-ordering of the sub-segments of a sound segment to create additional sounds (i.e. playing a sound segment backwards). The apparatus includes a control that will record and playback individual or groups of sound segments. A memory or skills game can be played in which the object is to re-assemble the sound segments to some determined order in a limited or unlimited amount of time. Levels of difficulty can be changed to make the game more challenging. The apparatus allows a player to create silly and entertaining stories by arranging the sound segments in some order and then playing some or all of them back to the player.

20 Claims, 7 Drawing Sheets

SOUND RECORDING AND PLAY BACK SYSTEM

TECHNICAL FIELD

The present invention generally relates to an electronic, computerized sound recording and playback system for educating or entertaining a user. More particularly, the invention relates to an apparatus and method wherein recorded sound can be reordered and played back in a variety of ways to create games and puzzles at the user's will.

BACKGROUND ART

A variety of games, toys and puzzles are known in the prior art which teach and entertain through the use of speech and sounds. Some toys pose problems concerning math, spelling, sentence structure and other topics. An existing toy, "The story book" made available by Mattel Toys, Inc. allows a player to create funny stories using a menu of sentence fragments.

The following United States Patents disclose systems believed representative of the prior art: U.S. Pat. No. 3,276,144, issued Oct. 4, 1966, U.S. Pat. No. 3,908,288, issued Sep. 30, 1975, U.S. Pat. No. 4,326,710, issued Apr. 27, 1982, U.S. Pat. No. 4,618,985, issued Oct. 21, 1986, U.S. Pat. No. 4,648,086, issued Mar. 3, 1987, U.S. Pat. No. 4,936,185, issued Jun. 26, 1990, U.S. Pat. No. 5,010,495, issued Apr. 23, 1991, U.S. Pat. No. 5,038,658, issued Aug. 13, 1991, and U.S. Pat. No. 5,145,447, issued September 8, 1992.

What these prior art toys and other devices all have in common is their limited flexibility concerning the topics they cover, how much of a topic can be covered, how many languages and dialects are used to communicate what is covered, and how these topics can be used in an entertaining or instructional game or puzzle format.

DISCLOSURE OF INVENTION

In view of the above problems, an ideal solution would include a method of acquiring, storing and retrieving unlimited speech and sounds; a method of creating a game out of the speech and sounds; a method of incorporating rules that would entertain the novice and challenge the expert. A physical unit encompassing the outlined features would be self-contained, portable, durable, small (i.e., hand held) and lightweight.

Therefore, a primary object of the present invention is to provide an electronic sound toy that is not limited to any one topic. It may be utilized to pose math problems, as well as geography problems, music questions and so forth.

Another primary object of the present invention is to provide an electronic sound toy that creates a game using the recorded speech and sounds.

Another primary object of the present invention is to provide an electronic sound toy that has different modes of play and levels of difficulty that incorporate rules; thus entertaining the novice and challenging the expert.

Another primary object of the present invention is to provide an electronic sound toy with the above objectives in a self-contained, portable, durable, small (i.e., hand held) and lightweight package.

According to the present invention, these objectives are attained by apparatus incorporating a recording means that can record and play back whatever the player wishes in whatever language he or she desires. A series of games may be played based on the idea of breaking the recorded sound into discrete segments and randomizing their order, with the task of re-ordering left up to the player. Operation of the apparatus may be varied with regard to: segment re-ordering, time limits, sound segment playback and the consequence of errors. The use of VLSI technology to implement the various operations allows the apparatus to be constructed and made available in a small, lightweight format.

In a preferred embodiment, the invention comprises an electronic toy equipped with sound means that is capable of recording and playing back a sixteen second stream of sound, though a longer or shorter sound stream duration could be used. A speaker and microphone are built into the toy. Segmenting means in operative association with the recording and playback means segments the sound stream into a plurality of discrete sound segments with each sound segment having a fixed or variable time duration that is less than or equal to the duration of the sound stream.

Retrieval means in operative association with segment memory means allows each segment of the sound stream to be recorded or played individually and the same operations can be applied to a subset of the available sound segments.

Re-ordering means in operative association with the sound segment means can change the order in which the sound segments can be played, recorded or manipulated. The sound segment order can be: ascending, random, or player described. The player would manipulate the ordering of sound segments, the recording and playing back of one or more sound segments with one of the manually actuatable elements in operative association with the said sound segment retrieval means and segment storage means.

The toy incorporates memory means in operative association with said sound segment ordering means which preserves both the original order and the current order of the sound segments. A further re-ordering of the sub-segments of a discrete sound segment is possible in order to create strange sounds (i.e. play a sound segment backwards).

Program control means allows a memory game to be created in which the object is to re-order the sound segments o some determined order in a limited or unlimited amount of time. Once the sound segments had been placed into the correct order, a win indicator would be actuated using the available display and contained sounds. Afterwards the game would be terminated.

There can be levels of difficulty to make the game more challenging based on limiting the amount of time available before the game is terminated or the random ordering of the sound segments. Another difficulty can be based on attempted ordering in which an incorrect re-order causes the game to terminate or re-order the sound segments in a random fashion. The program control can also allow the player to create silly and entertaining stories by arranging the sound segments in some order and then playing them back to the player. Not all of the sound segments would need to be played.

Display means can be used to give feedback to the player about the current order of the sound segments in respect to a known order, timing information, win or lose indication and other status information.

Other features, advantages, and objects of the present invention will become apparent with reference to the following description and accompanying drawings.

BEST MODE FOR CARRYING OUT THE INVENTION

Figure 1:
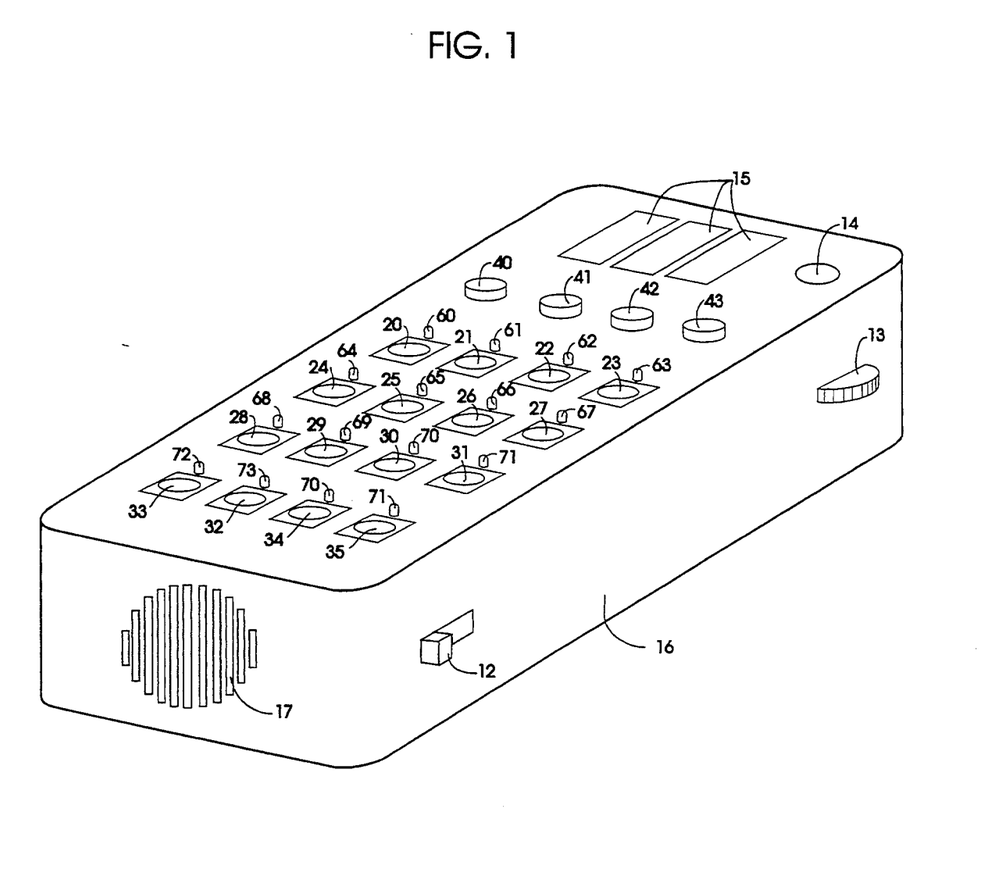
FIG. 1 is a perspective view illustrating a hand held electronic toy constructed in accordance with the teachings of the present invention.
Figure 2A:
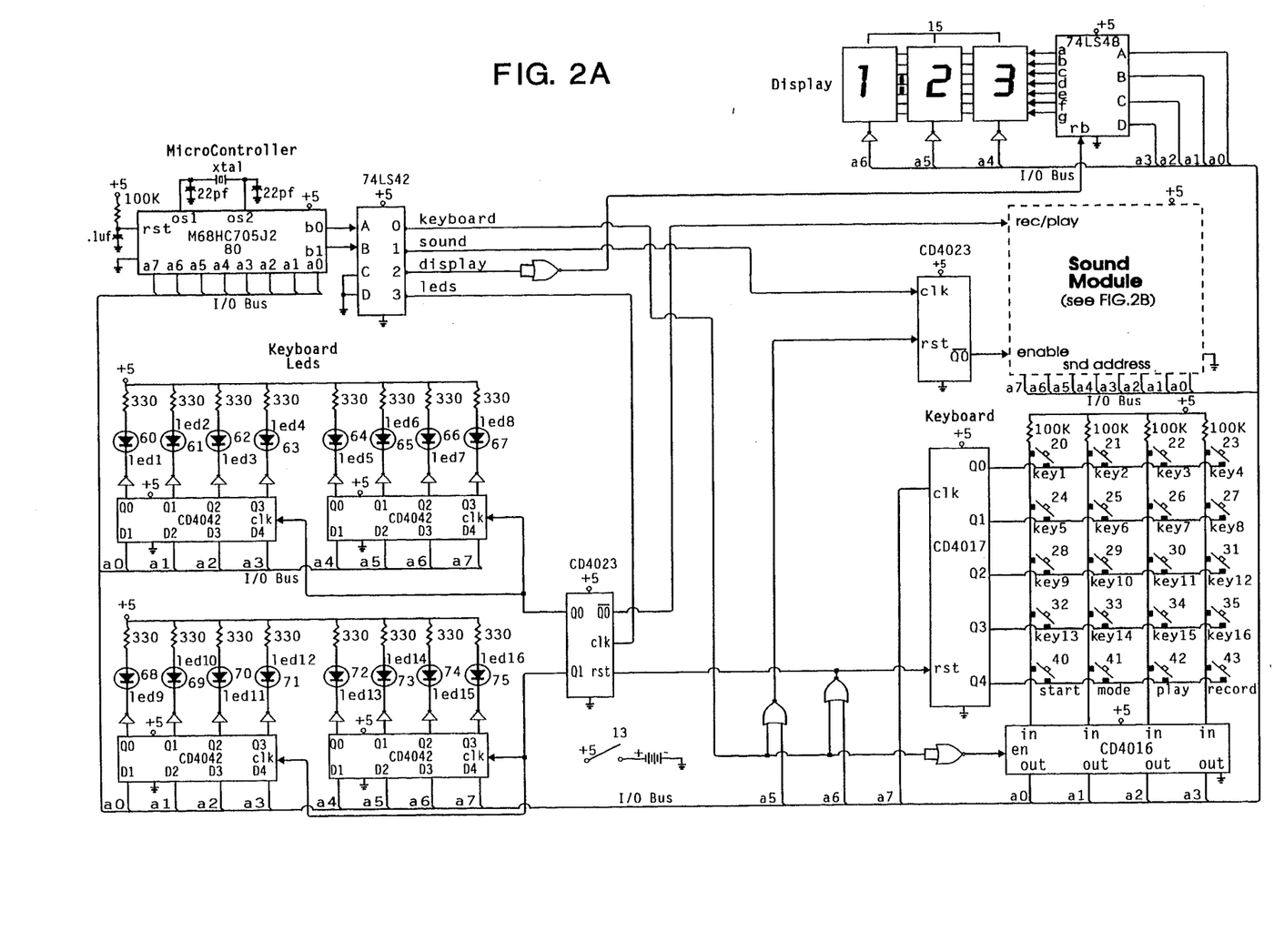
FIGS. 2A and 2B are schematic diagrams of the electronic circuitry of the toy shown in FIG. 1 with FIGS. 2A and 2B illustrating complementing portions of the circuitry.
Figure 2B:
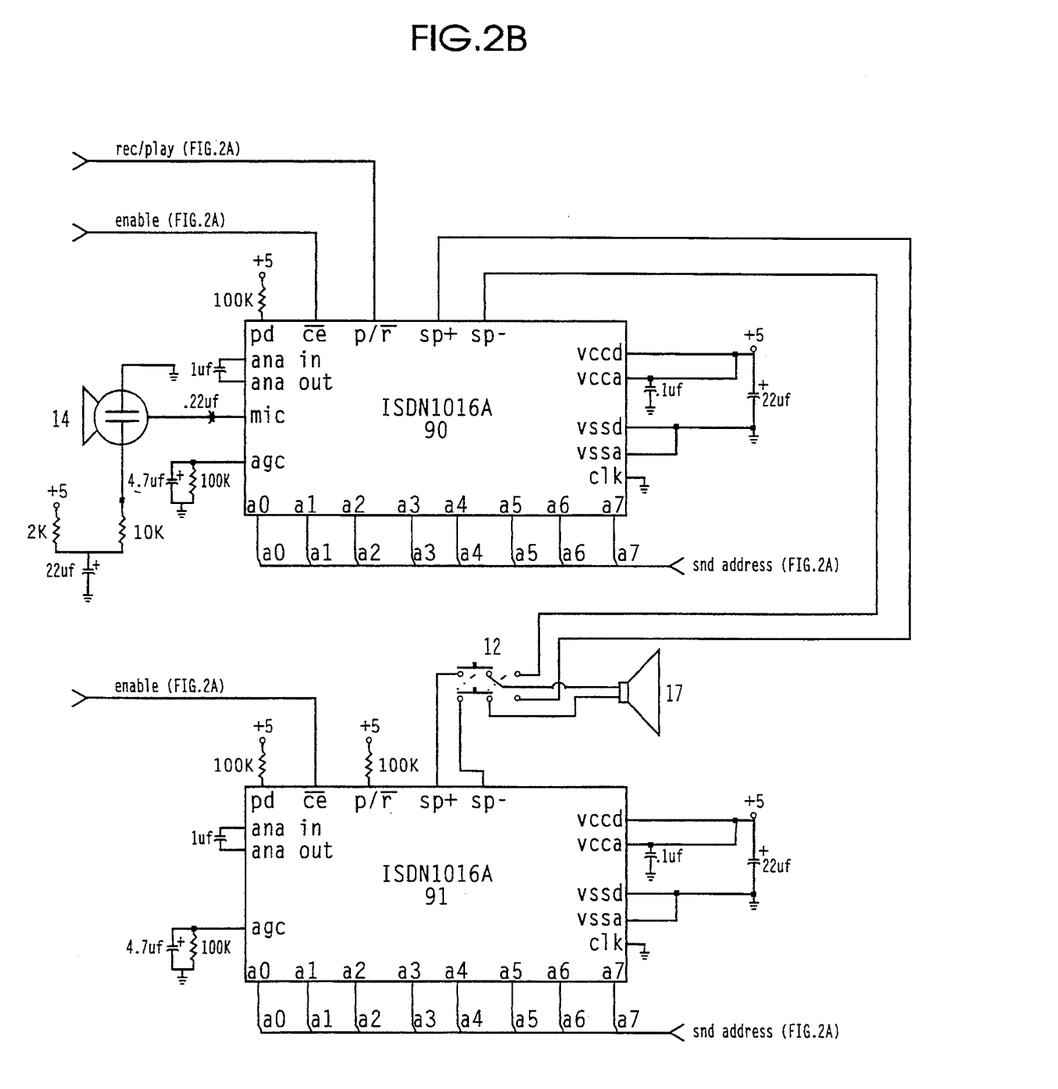
Figure 3:
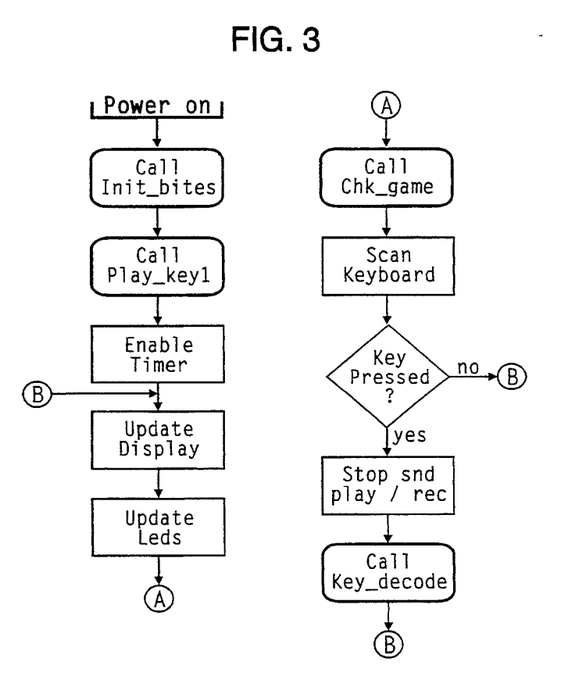
FIGS. 3 through 11 are flow charts illustrating the operation of the toy.
Figure 4:
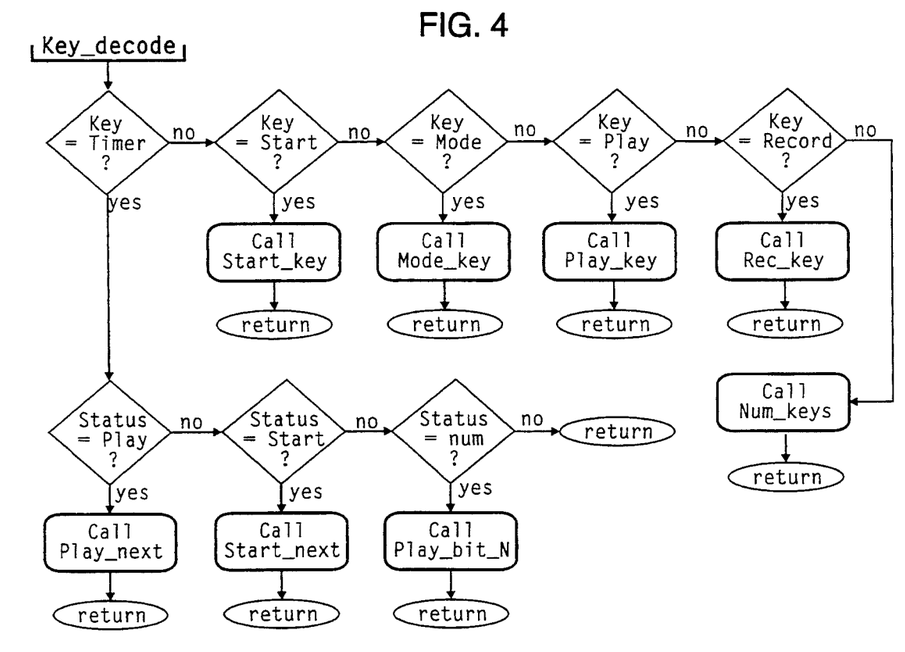
Figure 5:
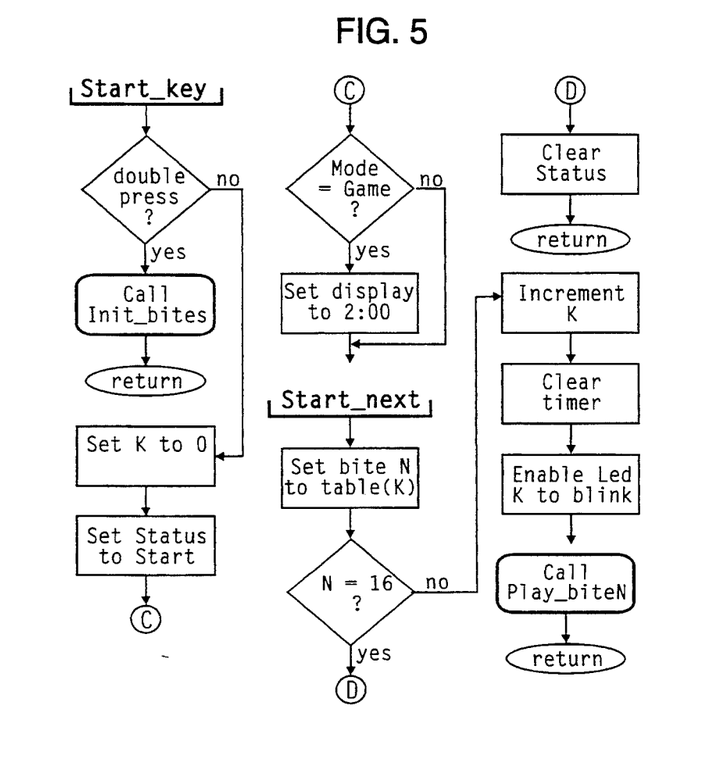
Figure 6:
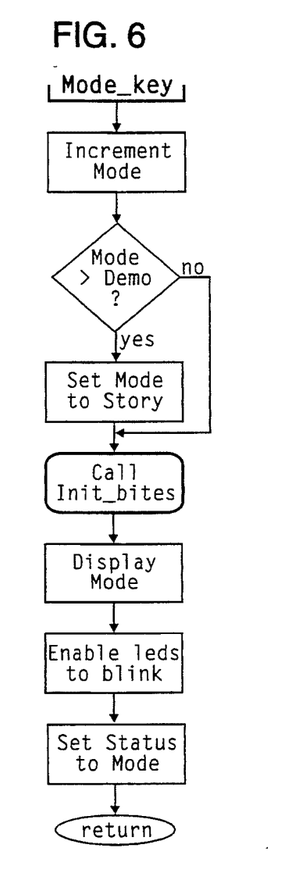
Figure 7:
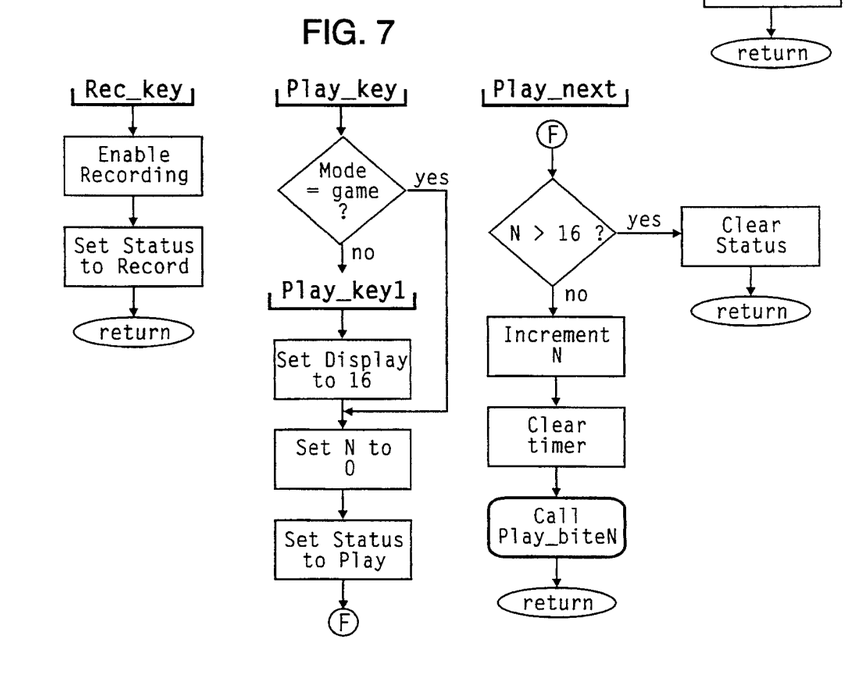
Figure 8:
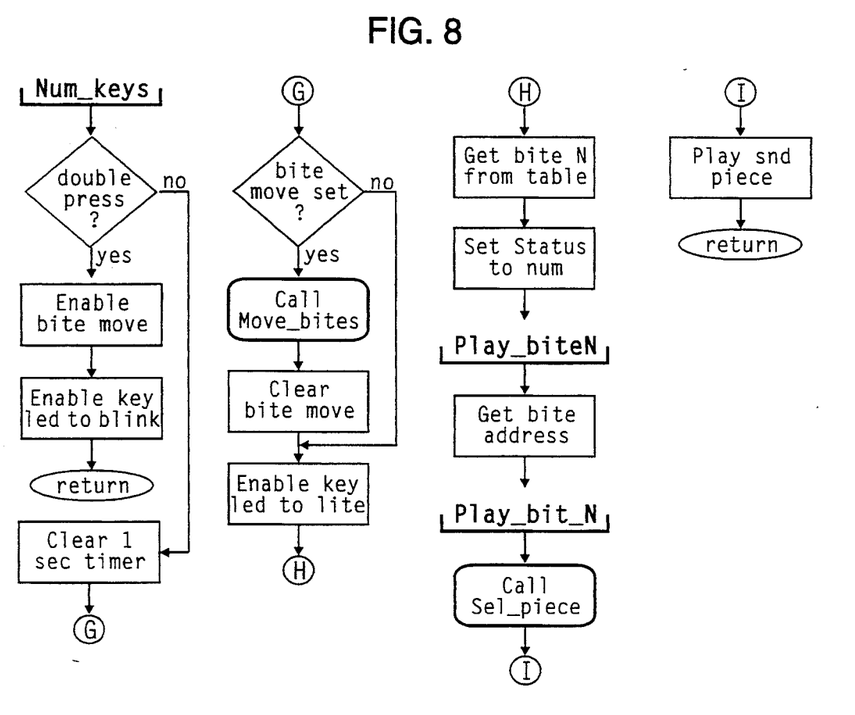
Figure 9:
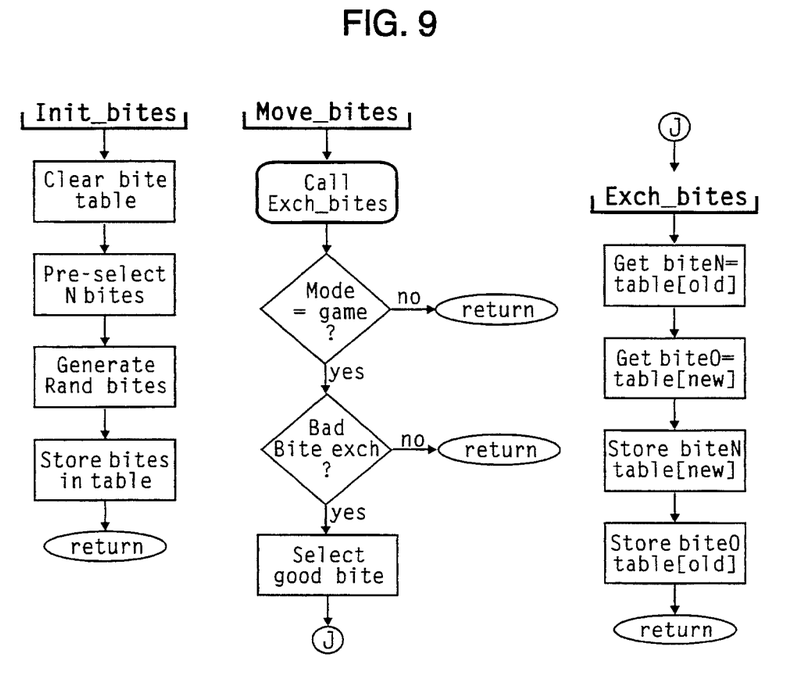
Figure 10:
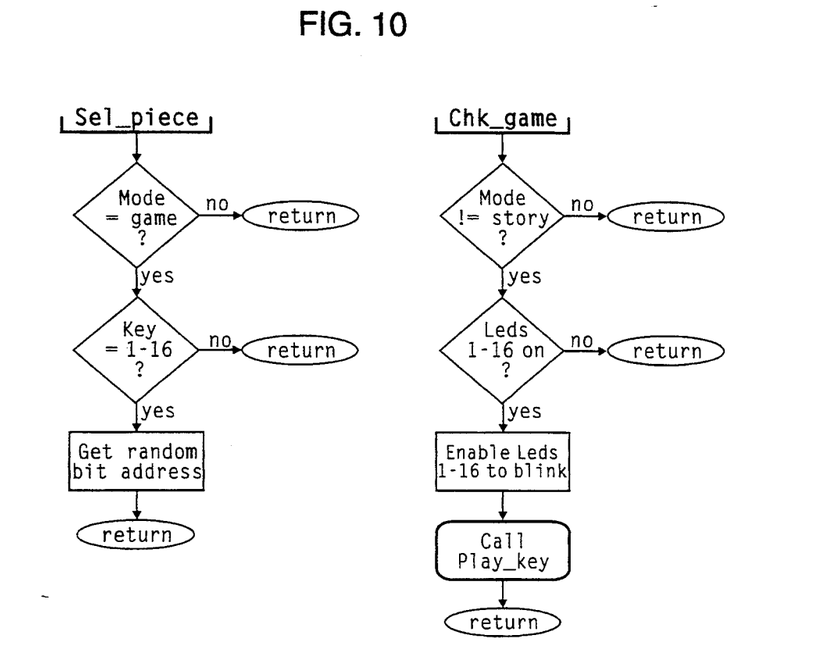
Figure 11:
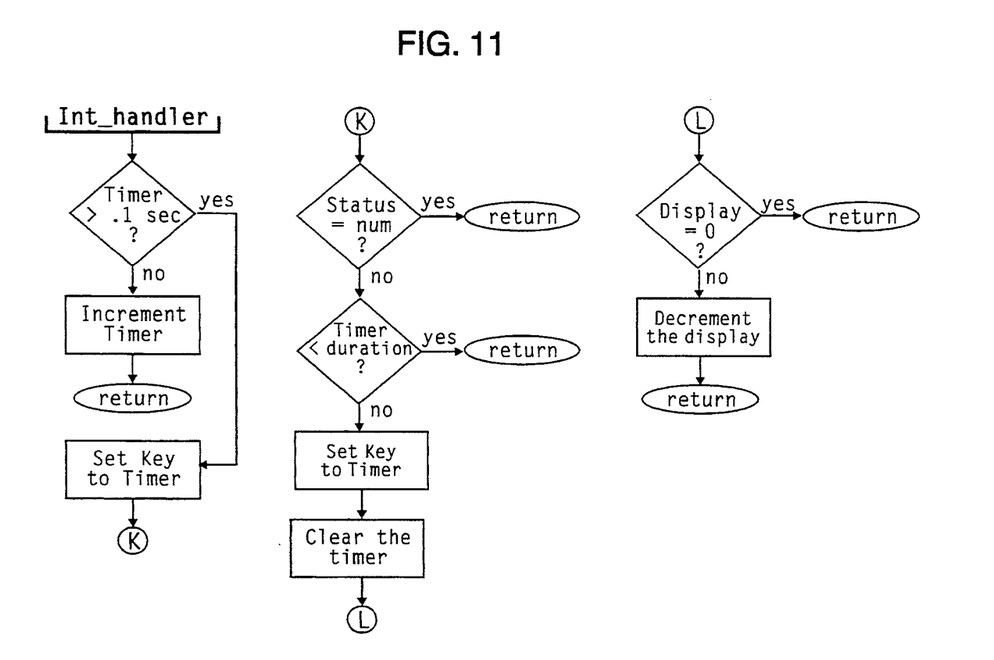

An embodiment of electronic toy apparatus constructed in accordance with the teachings of the present invention will be described with references to FIGS. 1 through 11. Referring to FIGS. 1-2B, the preferred embodiment has a chassis 16 with a power switch 13. Also mounted on or in the chassis 16 are sixteen "sound keys" (comprised of switches 20-35), sixteen "sound lights" (comprised of LEDS 60-75) placed to correspond with the sound keys respectively, four control buttons (comprised of switches 40-43), a digital display 15 comprising three digits used to display time in minutes: seconds and status information, a speaker 17 (shown in FIG. 1 with a protective grill), a microphone 14 (shown in FIG. 1 with a protective grill) and a sound selection switch 12.

The sound keys 20-35 in an actual unit will be labeled or identified by identification numbers (not shown) "1" through "16" respectively. Each sound key will start the recording or playback of a sound segment for a fixed or variable length time. The respective sound light for the sound key pressed will also light for the duration that sound segment is being recorded or played. The sound lights are also used for status information.

The control buttons 40-43 are respectively labeled "START", "MODE", "PLAY", and "RECORD". In the interest of simplicity, such identification is not shown. The START button will initiate the playing of each sound segment in a random sequence and can also reset the toy by quickly pressing the button twice within a two second period. The MODE button will select one of three available modes of operation. The PLAY button will initiate the playback of the selected sixteen sound segments in the correct sequence. The RECORD button in conjunction with the PLAY button or one of the sixteen sound keys will initiate the recording of a new sound stream or sound segment.

The sound selection switch 12 is preferably labeled "Sound INT/EXT". The switch selects either the use of a sixteen second sound stream that can be played only (switch set to INT) or the selection of the other sixteen second sound stream that can be recorded and played back by the player.

When the toy is first powered on using the on/off switch 13, the toy will be in "DEMO" mode and will initiate the playback of the selected sixteen second sound stream using the speaker 17. The selected sound stream heard is dependent on the position of the sound selection switch 12. The playback sequence of the individual sound segments, that makeup the sound stream, shall be in the correct order that was originally recorded. The digital display 15 will display sixteen seconds and will count down to 0 by one second decrements. The sound lights one 60, six 65, eleven 70 and sixteen 75 will be lit. The lights indicate that the sound segments one, six, eleven and sixteen correctly correspond to the sound keys one 20, six 25, eleven 30 and sixteen 35. The remaining twelve sound segments have been randomly assigned to the remaining twelve sound keys.

After the toy has finished playing the sound stream, the player can replay the same sound stream by pressing the PLAY button 42. The other available sound stream can be heard by sliding the sound selection switch 12 to the other position and then pressing the PLAY button 42. Playback of a sound segment can be done by pressing one of the sixteen sound keys 20-35. The sound light 60-75 associated with the sound key pressed 20-35 will light while the sound segment is being played. If a sound key 20-35 is pressed multiple times in less than two seconds then the following will happen:

1) The playing of the sound segment associated with the sound key 20-35 pressed is stopped.

2) The sound light 60-75 for that sound key pressed will blink on and off. The blinking sound light indicates that the sound segment associated with that sound key 20-35 has been selected to be exchanged with the sound segment of the next sound key 20-35 pressed. This is how sound segment order is change.

To select other modes of operation, the player would press the MODE button 41 and the digital display 15 would display ":01" indicating STORY mode. Pressing the MODE button 41 again would cause the display 15 to display ":02" indicating GAME mode. Pressing the MODE button 41 again would cause the display 15 to display ":03" indicating DEMO mode. Pressing the MODE button 41 again will cycle back to the first mode. Once the mode has been selected, the START button 40 is pressed to begin operation.

To record a new sound stream using the microphone 14 the player would set the sound selection switch 12 to EXT., would hold down the RECORD button 43 and press the PLAY button 42 when ready to start recording. The digital display 15 would display sixteen seconds ":16" and would count down from sixteen to zero in one second decrements while recording is in progress.

To record a single sound segment for a particular sound key 20-35 using the microphone 14, set the sound selection switch 12 to EXT., hold down the RECORD button 43 and press one of the sixteen sound keys 20-35 when ready to start recording. The sound light 60-75 for that sound key 20-35 will light while recording is in progress.

To automatically hear each sound segment that has been associated with a sound key 20-35 press the START button 40. The sound segment for each sound key 20-35 is played and the corresponding sound light 60-75 is lit.

The following games are possible, with the games being a representation of the type of games that can be selected by the MODE button 42. They are not complete, but merely demonstrate the toy's capabilities.

DEMO mode

The object of the game is to sequence the randomly ordered sound segments so that the resultant sound stream matches the original stream. For example, if the following rhythm was recorded by the toy:

"one two tie your shoe three four close the door five six pickup sticks seven eight open the gate nine ten eat the pen" pause The toy would chop the sound stream into sixteen one second sound segments and would associate the sound segments to the sound keys 20-35 in a random order. The sound keys 20-35 could contain the following phrases:

| [20] "one two" | [21] "gate" | [22] "seven eight" |
| [23] "pickup" | [24] "pen" | [25] "door" |
| [26] "shoe" | [27] "three four" | [28] "nine ten" |
| [29] "Close the" | [30] "Eat the" | [31] "open the" |
| [32] "five six" | [33] "Tie your" | [34] "sticks" |
| [35] pause | | |

Pressing each sound key 20-35 would play the associated sound segment as described above. When the START button 40 is pressed, The sound segment for each sound key 20-35 is played and sound light 60-75 corresponding to the sound key 20-35 being accessed is lit. The player would then have a unlimited period of time to correctly arrange the order of the sound segments.

Sound segments are reordered by selecting the sound segment to be moved by pressing the sound key 20-35 that contains the sound segment multiple times in less than two seconds and then pressing the sound key 20-35 that you want to contain the previously selected sound segment. The sound segments will then be exchanged.

When a sound segment is placed in the correct sequence, the sound light 60-75 for that sound key 20-35 will be lit. In the above example, the sound lights 60-75 for sound key one 60 and sound key sixteen 75 would be lit. If the sound segment for sound key fourteen 33 is exchanged with the sound segment on sound key two 21, then the sound light for sound key two 21 would be lit. Hints, such as flashing on the display 15 what the correct sound key is for the sound segment being played, can be used to help solve the puzzle.

STORY mode

The player may put together a story using some or all of the previously recorded sound segments. The player arranges the order of the sound segments using the multiple press method previously described in DEMO mode and then presses the START button to hear the story. The story starts by playing the sound segment associated with sound key one 20 and then retrieves and plays the sound segment for sound key two 21 and so on until the sound key 20-35 containing sound segment sixteen is played All of the sound lights 60-75 are off except for the sound light 60-75 where sound segment sixteen is located. For example: If the toy contained the rhythm previously described and the sound keys 20-35 and associated sound segments were as follows:

| [20] "one two" | [21] "Eat the" | [22] "shoe" |
| [23] "pause" | [24] "pen" | [25] "door" |
| [26] "seven eight" | [27] "three four" | [28] "nine ten" |
| [29] "Close the" | [30] "gate" | [31] "open the" |
| [32] "five six" | [33] "Tie your" | [34] "sticks" |
| [35] "pickup" | | |

Pressing the START button 40, the toy would playback "one two eat the shoe", pause and cease playback.

GAME mode

The object of the game is to sequence the randomly ordered sound segments so that the resultant sound stream matches the original stream and to do so while encountering increasing difficulties. Operation is the same as DEMO mode with the added difficulties:

1) Time to re-order the sound segments is limited

2) Re-ordering errors will result in loss of correctly ordered segments.

3) Identification of a sound segment can be made difficult by chopping a sound segment into ten or more discreet sub-segments and reversing the order of the Sub-segments. This would have the effect of playing back a sound segment backwards. The order can also be random, making it even harder to recognize the sound segment.

4) Reordering the incorrectly placed sound segments based on the number of key presses, which keys pressed, time or re-order moves.

5) Vary the play/record duration of each sound segment

6) Loss of correctly placed sound segments can be based on solve-sequence or number of overall mistakes. Time elapsed can also be used.

7) Intermixing sub-segment pieces from other sound segments into a single sound segment during playback.

8) Addition of sound storage means to create a game in which the object is to re-order multiple groups of sixteen second sound segments.

9) Decrease total sound stream limit from sixteen seconds thus decreasing each individual sound segment length.

In the present embodiment, The microcontroller 80 may be of the type commercially available from Motorola, Inc. under the component designator "MC6805". A clock crystal with a frequency of 2.097152 mhz is used to provide accurate time. Using program control, contained in the microcontroller, the microcontroller is able to control the various external devices such as keyboard sensing 20-43, controlling the sound lights 60-75, controlling the display 15, and controlling the sound module. Additional programs in the microcontroller (outlined in FIGS. 3-11) also provide logical functions such as the generation of random numbers, storage of sound segment addresses, rules for the various modes, timer processing and overall operation.

The sound chips 90-91, found in the sound module used in this embodiment may be of the type commercially available from Information Storage Devices, Inc., 2841 Junction ave, San Jose Calif., under the component designator "ISD1016A". Sound chip 90 is used to record and playback sound inputted by the player, whereas sound chip 91 is used to playback sound only. Each sound chip contains an address input that allows the chip to began recording or playing back sound from the start of the sound stream (0.00 seconds) to almost the end of the sixteen second sound stream (15.9 seconds). The addressing provides 0.10 second resolution. The sound chips also have control lines for starting and stopping the sound operation, selecting the playback or record operation and saving power. By coupling these control lines and address inputs with the I/O lines of the microcontroller allows for the playback and recording of sound segments as short as 0.10 seconds and as long as sixteen seconds. It also allows for sound segments to start anywhere within the zero to 15.9 second window.

The digital display 15 is made up of 3 seven segment LED displays coupled together in a multiplex configuration utilizing a single BCD segment driver and individual digit drivers. The microcontroller, under program control, will refresh each digit at least 100 times a second to present a flicker free display.

The sound lights 60-75 are made up of individual LEDS with pull-up resistors and utilizing drivers that are coupled to latches. The latches are used as a storage medium to reduce the storage load on the microcontroller. The microcontroller, under program control, transfers the desired bit pattern to each of the latches at least 30 times a second. This allows different blinking rates of the LEDS to be displayed as required.

The sixteen sound keys 20-35 and four control buttons 40-43 are switches arranged in a 4×5 multiplex configuration. The microcontroller, under program control, enables the switches to be read and scans each row of switches at a rate of at least 30 times a second.

FIGS. 3 through 11 shows how the microprocessor may De programmed to produce the described behavior. For those skilled in the art of programming microprocessors of the type stated above, these diagrams will be self explanatory. Referring now to FIGS. 2A-11, when the off/on switch 13 is closed, the microcontroller executes an initialization procedure that clears the RAM in the microcontroller and generates random numbers. The numbers generated are between one and sixteen with no duplicate numbers allowed. Each number represents a sound segment and is stored in a sixteen byte array called the sound table. Each sound table byte address corresponds to one of the sixteen sound keys 20-35. For example, if byte one of the sound table contained a five, then the fifth sound segment would be associated with the first sound key 20. Since the toy by default powers up in DEMO mode, the sound segments one, six, eleven and sixteen are forced to the correct sound keys so the player need only determine the correct placement of the remaining twelve sound segments.

The duration of each sound segment can be fixed or variable. The same random number generator just mentioned is used to generate numbers in the three to twenty three range with the average being ten. These numbers would be sound segment durations as measured in ten second increments and could be stored in a sixteen byte array and indexed the same way as the sound table. Therefore a sound key not only represents a particular sound segment, but also the time duration of that sound segment.

Also during initialization, the currently selected sound stream will began to play each sound segment in the correct sequence starting with sound segment one. The playback of the first sound segment is started by placing a logical 00 on the sound address bus and enabling the sound module. The display 15 is set to sixteen and the microcontroller's internal timer is enabled to generate interrupts every 50 msec. A loop begins with the display 15 being refreshed, the sound lights 60-75 are refreshed, the keyboard is scanned and a check is made to see if the player has successfully arranged the sound segments in correct sequence, if yes, then a win is indicated using the sound lights and the current mode is terminated. If no key press detected and the current mode is not terminated, then the loop starts over.

The first sound segment will continue to play for s duration. The duration will be forced to one second for the operation. Once the time has elapsed, the internal timer will generate an internal key press called Timer. This key press will cause the sound module to be disabled and the starting address of the next sound segment is retrieved from the sound table and placed on the sound address bus, the duration timer is reset, the sound module is enabled to start playing the new sound segment and the display is incremented by one. This process will repeat until the last sound segment is completely played and the display 15 is displaying zero. If the player presses a key during this sixteen second interval, then the playback of the selected sound stream is canceled and the operation selected by the player is started.

When the player presses the START button 40, the button press is detected during the keyboard scan and decoded. A flag is checked to see if this is a double press, which means: has the same button been pressed within the last two seconds ? If yes, then the toy is reset back into DEMO mode and will wait for the player to press a button or key. If this button press is not a double press and if in GAME mode then the display 15 will be set to two minutes. The playback of the sound segments will also be started. The sequence of the sound segments being played back will be derived from indexing into the sound table from one to sixteen. (representing the sixteen sound keys) and the duration of each sound segment will also be retrieved using the same index. Once the sound segment number and duration have been retrieved then the actual starting address of the sound segment is calculated and is placed on the sound address bus, the timer is reset and the sound module is enabled to start playing the new sound segment. The sound segment will continue to play until the duration of that sound segment has been reached. Likewise the sound light will be enabled to blink for the duration that the sound segment is played. Once the duration is reached, the timer will generate a Timer key press, which will stop the playing of the current segment and turn off the sound light associated with the key. The next sound segment is played after having retrieved sound segment number and duration from the sound and duration tables. All sixteen sound segments will be heard unless the toy is STORY mode, where only the sound segments prior to sound segment sixteen are played.

When the player presses the MODE button 41, the button press is detected during the keyboard scan and decoded. The current sound operation is canceled, the toy is reset, a one is displayed 15 indicating STORY mode, the sound light sixteen 75 is enabled to blink and the status is set to the mode. Pressing the MODE button again will cause the toy to increment to the next mode, a two is displayed 15 indicating GAME mode, the sound lights four 63, seven 66, ten 69 and thirteen 72 are enabled to blink and the status is set to the mode. Pressing the MODE button again will cause the toy to increment to the next mode a three is displayed 15 indicating DEMO mode, the sound lights one 60, six 65, eleven 70, sixteen 75 are enabled to blink and the status is set to the mode. Pressing the MODE button again will cause the mode to cycle back to mode one. Once a mode has been selected, the player presses the START button 40 to enable the selected mode.

When the player presses the PLAY button 42, the button press is detected during the keyboard scan and decoded. The current sound operation is canceled, the display 15 will be set to sixteen if not in GAME mode. Simultaneous the first sound segment will start to play for it's associated time duration which is forced to one second. Once the time has elapsed, the internal timer will generate an internal key press called Timer. This key press will cause the sound module to be disabled and the starting address of the next sound segment is placed on the sound address bus, the timer is reset, sound module is enabled to start playing the new sound segment for it's specified duration and the display 15 if enabled is incremented by one. This process will repeat until the last sound segment is completely played. If the player presses a key during this sixteen second interval, then the playback of the selected sound stream is canceled and the new operation selected by the player is started.

When the player holds down the RECORD button 43, the button press is detected during the keyboard scan and decoded. The current sound operation is canceled and the sound module is enabled for recording. The player then presses the PLAY button to begin recording a new sixteen second sound stream or can press an individual sound key 20–35 to record a single sound segment. If the player presses the START button then a new sixteen second sound stream will be recorded according to the current sound segment sequence.

When the player presses one of the sixteen sound keys 20–35, the key press is detected during the keyboard scan and decoded. A flag is checked to see if this is a double press, which means: has the same key been pressed within the last to seconds?. If yes, then the sound segment associated with that sound key is retrieved from the sound table and is selected to be exchanged with the next sound key pressed. The sound light associated with the double pressed key will blink to indicate that a sound segment move is in progress. Pressing a sound key 20–35 will cause the sound segment for the associated sound key to be retrieved from the sound table and exchanged with the previously retrieved sound segment. The time durations associated with the respective segments are also exchanged.

If the key press is not part of a double press, then the sound segment for that sound key 20–35 will be derived by indexing into the sound table using the sound key as an index, and the duration of the sound segment will also be retrieved using the same index. Once the sound segment number and duration have been retrieved then the actual starting address of the sound segment is calculated and is placed on the sound address bus, the timer is reset and the sound module is enabled to start playing the new sound segment. The sound segment will continue to play until the duration of that sound segment has been reached. If the toy is operating in GAME mode, instead of the sound segment being played for it's time duration, the sound segment can be played in tenth second increments called sub-segments. The sequence of the sub-segments can be in a ascending, reverse, or random order. For example, if sound segment one is about to played and the sub-segment order is to be reversed then the sound segment address would be calculated using the original starting address of the sound segment and the duration of the sound segment minus one tenth second. This resultant address would be placed on the sound address bus and the sound module would be enabled to play. After a tenth of a second had expired a Timer key would be generated to stop playing the current sound segment. The sound address of the prior sub-segment would be calculated and that sub-segment would be played and so forth until all of the sub-segments had been played for the selected sound segment. This will produce the effect of rendering the sound segment backwards, thus making it more difficult to recognize and place correctly. The sound light will be lit for the overall duration that the sound segment is played. Once the duration is reached, the timer will generate a Timer key press, which will stop the playing of the current segment and turn off the sound light associated with the sound key 20–35.

I claim:

1. Apparatus for recording and playing back sound, said apparatus comprising, in combination:

recording means for recording sound for a period of time;

segmenting means in operative association with said recording means for segmenting said recorded sound into a plurality of discrete sound segments soley according to a time based algorithm and irrespective of the contents of the recorded sound, said sound segments each being of a set duration shorter than said period of time;

reordering means in operative association with said segmenting means for reordering the sequence of said plurality of discrete sound segments, each reordered discrete sound segment continuing of set duration;

sound segment storage means in operative association with said reordering means for storing said reordered discrete sound segments;

sound segment retrieval means in operative association with said sound segment storage means for selectively separately retrieving at least some of said reordered discrete sound segments from said sound segment storage means; and play back means operatively associated with said sound segment retrieval means for playing back the retrieved reordered discrete sound segments of set duration in the order of retrieval of said reordered discrete sound segments from said sound segment storage means by said sound segment retrieval means.

2. The apparatus according to claim 1 additionally comprising sound segment modifying means for selectively modifying the sounds of individual discrete sound segments before play back of said individual discrete sound segments by said play back means.

3. The apparatus according to claim 1 wherein said sound segment retrieval means includes a plurality of manually actuatable elements, each said manually actuatable element being operable upon manual actuation thereof to retrieve a single discrete sound segment from said sound segment storage means.

4. The apparatus according to claim 3 additionally comprising an indicator operatively associated with each of said manually actuatable elements for conveying information to a user of the apparatus regarding operation of the apparatus.

5. The apparatus according to claim 3 additionally comprising means for changing the sound segments retrieved from said sound segment storage means by at least one of said manually actuatable elements.

6. The apparatus according to claim 1 wherein said reordering means includes randomizing means for arranging the plurality of discrete sound segments in a random sequence.

7. The apparatus according to claim 1 additionally comprising comparator means for comparing the sequence of discrete sound segments retrieved from said sound segment storage means by said sound segment retrieval means to the sequence of the discrete sound segments in the recorded sound prior to reordering of said discrete sound segments.

8. The apparatus according to claim 7 wherein said apparatus is an electronic game of skill wherein a user attempts to match the discrete sound segments retrieved from said sound segment storage means to the sequence of the sound segments in the recorded sound prior to reordering of said sound segments, said apparatus additionally comprising timer means for limiting the user's attempts to a predetermined time frame.

9. The apparatus according to claim 7 including means for terminating the operation of said apparatus when the sequence of discrete sound segments retrieved from said sound segment storage means by said sound segment retrieval means is the same as the sequence of the discrete sound segments in the recorded sound prior to reordering of said discrete sound segments.

10. The apparatus according to claim 7 wherein said apparatus is an electronic game of skill wherein a user attempts to match the segments retrieved from said sound segment storage means to the sequence of the said segments in the recorder sound prior to reordering of said sound segments, said apparatus additionally comprising means for varying the difficulty of said game of skill.

11. The apparatus according to claim 1 wherein said play back means is selectively operable to play back said plurality of discrete sound segments in the original sequence of said plurality of discrete sound segments in said recorded sound.

12. A method of recording and playing back sounds, said method comprising the steps of:
  recording sound for a period of time;
  segmenting said recorded sound into a plurality of discrete sound segments solely according to a time based algorithm and irrespective of the contents of the recorded sound, said sound segments each being of a set duration shorter than said period of time;
  reordering the sequence of said plurality of discrete sound segments, each reordered discrete sound segment continuing of set duration;
  storing said reordered discrete sound segments;
  selectively separately retrieving at least some of said stored reordered discrete sound segments; and
  playing back the retrieved reordered sound segments of set duration in the order of retrieval of said reordered discrete sound segments.

13. The method according to claim 12 wherein the step of reordering the sequence of said plurality of discrete sound segments comprises arranging said plurality of discrete sound segments in a random sequence.

14. The method according to claim 12 including the additional step of selectively modifying the sounds of individual discrete sound segments before the step of playing back the retrieved reordered sound segments.

15. The method according to claim 12 wherein the step of selectively separately retrieving said stored reordered discrete sound segments includes sequentially manually actuating a plurality of elements, each said element corresponding to one of said reordered discrete sound segments.

16. The method according to claim 12 wherein said predetermined duration is substantially the same for all of said discrete sound segments.

17. The method according to claim 12 including the additional step of comparing the sequence of discrete sound segments retrieved during said retrieval step to the sequence of the discrete sound segments in the recorded sound prior to said reordering step.

18. The method according to claim 12 including the step of timing the duration of said retrieving step.

19. The method according to claim 12 including the additional step of conveying information to an individual concerning said reordered discrete sound segments.

20. The method according to claim 12 wherein said step of segmenting said recorded sound comprises segmenting said recorded sound into a plurality of discrete sound segments of random duration.

* * * * *